(12) United States Patent
Beall et al.

(10) Patent No.: US 9,221,192 B2
(45) Date of Patent: Dec. 29, 2015

(54) CERAMIC PROCESSING FIRING

(75) Inventors: Douglas Munroe Beall, Painted Post, NY (US); Dana Craig Bookbinder, Corning, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/885,271

(22) PCT Filed: Jan. 6, 2012

(86) PCT No.: PCT/US2011/062278
§ 371 (c)(1),
(2), (4) Date: Jul. 25, 2013

(87) PCT Pub. No.: WO2012/074944
PCT Pub. Date: Jun. 7, 2012

(65) Prior Publication Data
US 2014/0148329 A1    May 29, 2014

Related U.S. Application Data

(60) Provisional application No. 61/418,181, filed on Nov. 30, 2010.

(51) Int. Cl.
*C04B 38/00* (2006.01)
*B28B 11/24* (2006.01)
(Continued)

(52) U.S. Cl.
CPC ............ *B28B 11/243* (2013.01); *B28B 11/247* (2013.01); *C04B 35/10* (2013.01);
(Continued)

(58) Field of Classification Search
CPC .... C04B 35/565; C04B 35/517; C04B 35/44; C04B 35/01; C04B 35/195; C04B 35/61; C04B 35/18; C04B 35/46; C04B 35/111; C04B 35/115; C04B 18/027; C04B 20/06
USPC ............... 501/80, 85, 88, 112, 118, 128, 134, 501/153; 502/180, 182, 527.19, 439
See application file for complete search history.

(56) References Cited

U.S. PATENT DOCUMENTS

| 1,068,762 A | 7/1913 | Grunzweig |
| 2,680,895 A | 6/1954 | Sjogren .......................... 25/157 |

(Continued)

FOREIGN PATENT DOCUMENTS

| CN | 101495422 A | 7/2009 |
| DE | 26 52 889 | 5/1978 |

(Continued)

OTHER PUBLICATIONS

Houseman, J. E., et al., "Influence of Kiln Atmospheres in Firing Structural Clay Products: I, Maturation and Technological Properties", Journal of The American Ceramic Society—Houseman and Koenig, vol. 54, No. 2, pp. 75-82.

(Continued)

*Primary Examiner* — Noah Wiese
(74) *Attorney, Agent, or Firm* — Joseph M. Homa; Matthew B. McNutt

(57) ABSTRACT

A process for producing a honeycomb ceramic article includes providing a green honeycomb body including ceramic-forming materials and organic pore forming materials and subjecting the green honeycomb body to a firing cycle in a kiln in which steam is added to the kiln atmosphere in an amount from about 10% to about 100%, based on volume. Also provided are ceramic articles produced by the process.

19 Claims, 10 Drawing Sheets

(51) Int. Cl.
*C04B 35/10* (2006.01)
*C04B 35/111* (2006.01)
*C04B 35/185* (2006.01)
*C04B 35/195* (2006.01)
*C04B 35/478* (2006.01)
*C04B 35/565* (2006.01)
*C04B 111/34* (2006.01)

(52) U.S. Cl.
CPC ............ *C04B 35/111* (2013.01); *C04B 35/185* (2013.01); *C04B 35/195* (2013.01); *C04B 35/478* (2013.01); *C04B 35/565* (2013.01); *C04B 38/0006* (2013.01); *C04B 2111/343* (2013.01); *C04B 2235/6562* (2013.01); *C04B 2235/6565* (2013.01); *C04B 2235/6567* (2013.01); *C04B 2235/6588* (2013.01); *C04B 2235/76* (2013.01)

(56) References Cited

U.S. PATENT DOCUMENTS

| | | | |
|---|---|---|---|
| 5,998,328 A * | 12/1999 | Dawes et al. | 502/182 |
| 6,309,558 B1 | 10/2001 | Kinoshita et al. | |
| 6,391,813 B1 * | 5/2002 | Merkel | 501/119 |
| 7,704,296 B2 * | 4/2010 | Merkel | 55/523 |
| 7,713,897 B2 * | 5/2010 | Ogunwumi et al. | 501/134 |
| 7,876,053 B2 | 1/2011 | Yamamoto et al. | |
| 8,501,296 B2 * | 8/2013 | Merkel | 428/116 |
| 2006/0234858 A1 * | 10/2006 | Ichikawa et al. | 502/178 |
| 2007/0141301 A1 * | 6/2007 | Boorom et al. | 428/116 |
| 2009/0057939 A1 * | 3/2009 | Henry et al. | 264/43 |
| 2009/0200712 A1 | 8/2009 | Hayashi et al. | 264/630 |

FOREIGN PATENT DOCUMENTS

| | | |
|---|---|---|
| JP | H10274486 A | 10/1998 |
| JP | 2002-284582 | 10/2002 |
| JP | 2007-230796 | 9/2007 |

OTHER PUBLICATIONS

Houseman, J. E., et al., "Influence of Kiln Atmospheres in Firing Structural Clay Products: II, Color Development and Burnout", Journal of The American Ceramic Society—Houseman and Koenig, vol. 54, No. 2, pp. 82-89.

Blokh, L. S.; Bondarenko, B. I.; Bezuglyi, V. K.; Sadunas, A., "Use of steam in firing wall ceramics" Stroitel'nye Materialy (1984), (5), 14. Language: Russian, Database: CAPLUS, Abstract.

JP 55154309, 19801201, From Kokai Tokyo Koho, "Honeycomb-structure activated carbon", Abstract.

JP 50005410, 19750121, From Koka Tokyo Koho, "Gas-permeable, porous sintered products", Abstract.

Chinese First Office Action and Search Report dated Jul. 23, 2014, relating to CN Patent Application No. 201280007054.X.

* cited by examiner

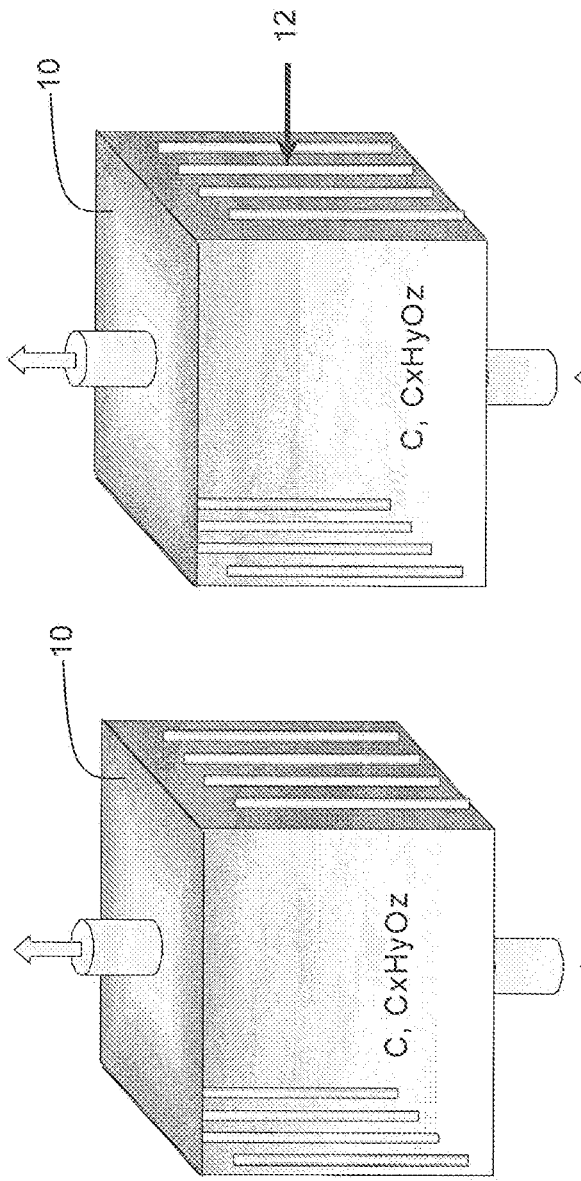

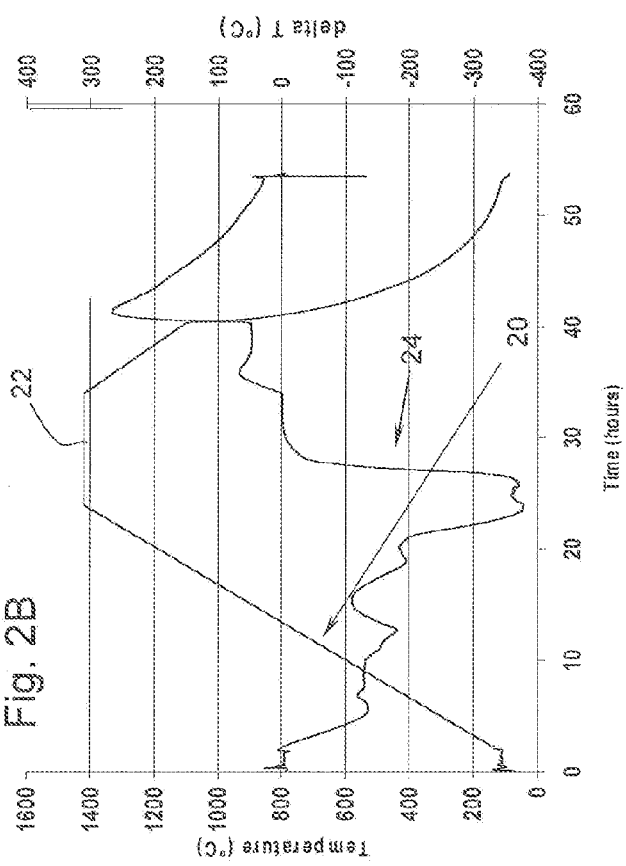
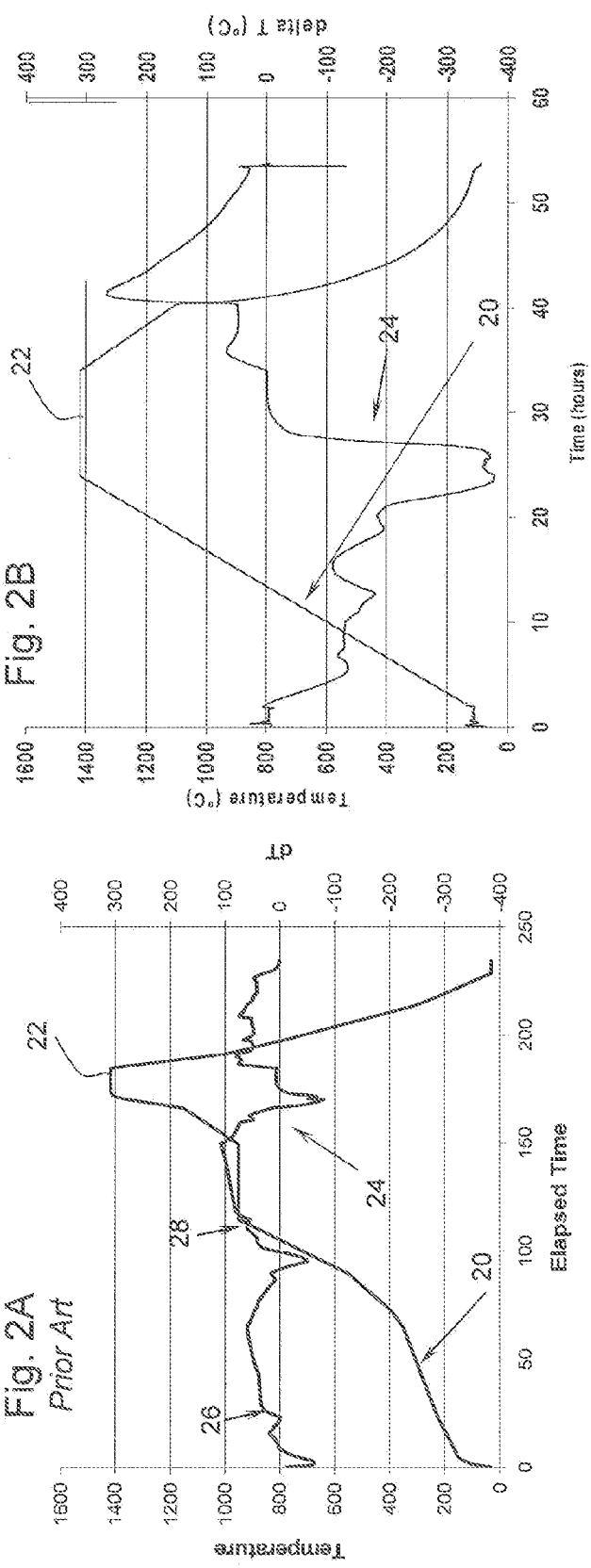
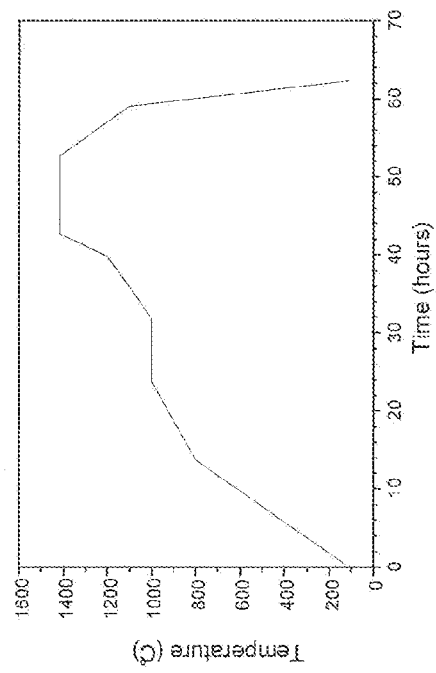

| Parameters | | Composition 1 fired in Air | Composition 1 fired in Steam | Comments |
|---|---|---|---|---|
| Diameter/CPSI/Wall | | 2/50 | 2/50 | |
| Firing Temperature (°C)/ramp rate (C/hr) | | 1420/50 | 1420/50 | |
| Contour Shrinkage | | 4% | 0% | Lower shrinkage -- steam |
| Matrix Density | (g/cm³) | 0.310 | 0.297 | Lower matrix density -- steam |
| CTE (RT-800 Heating/Cooling) | (1 x10⁻⁷/°C) | 13.1/16.7 | 10.3/16.3 | Lower CTE -- steam |
| CTE /500-800 °C (H/C) | (1 x10⁻⁷/°C) | 22.2/23.2 | 17.0/18.5 | Lower CTE -- steam |
| MOR | (Psi) | 161 | 358 | Higher Strength -- steam |
| EMOD | (x10⁵ Psi) | 2.55 | 3.10 | Lower EMOD -- steam |
| Strain Tolerance | (ppm) | 454 | 1240 | Higher ST -- steam |
| Intrinsic Strength | (Psi. cm³/g) | 520 | 1200 | Higher strength -- steam |
| Thermal Shocking Limit | (°C) | 704/958 | 1209/1170 | Higher predict TSL -- steam |

Fig. 11A

| Parameters | | Composition 1 fired in Air | Composition 1 fired in Steam | Comments |
|---|---|---|---|---|
| Diameter/CPSI/Wall | | 5.66/275/8 | 5.66/275/8 | |
| Firing Temperature (°C)/ramp rate (C/hr) | | 1420/50 | 1420/50 | |
| Porosity | (%) | 57.5 | 60.3 | Higher porosity -- Steam |
| d50 | (μm) | 15.5 | 11.9 | Smaller pore sizes -- Steam |
| d10 | (μm) | 11.8 | 7.7 | Smaller pore size -- Steam |
| d90 | (μm) | 22.6 | 16.6 | Smaller pore size -- Steam |
| Distribution | $(d_{50}-d_{10})/d_{50}$ | 0.24 | 0.35 | Slightly broader distribution -- Steam |
| Distribution | $(d_{90}-d_{10})/d_{50}$ | 0.70 | 0.92 | Slightly broader distribution -- Steam |
| MgO (minor only) | | 0.039 | 0.137 | More intrusions -- Steam |
| Cordierite-Orthorhombic | (%) | 74.7 | 69.9 | Higher Ortho cordierite -- steam |
| Cordierite-Hexagonal | (%) | 14.5 | 5.2 | Low Hexagonal -- Steam |
| Secondary Phase (Spinel/Sapphirine/Mullite) | (%) | 1.4/3.5/0.2 | 0.6/3.2/0.1 | Low Secondary -- Steam |
| Amorphous Phase | (%) | 5.6 | 0.8 | Very low residual glass -- Steam |
| I ratio | (Axial/Transverse/Power) | 0.04/0.76/0.85 | 0.06/0.78/0.86 | Same crystal orientation |

Fig. 11B

CERAMIC PROCESSING FIRING

CROSS-REFERENCE TO RELATED APPLICATIONS

This application claims the benefit of priority under 35 U.S.C. §119 of U.S. Provisional Application No. 61/418,181 filed on Nov. 30, 2010, the content of which is relied upon and incorporated herein by reference in its entirety.

BACKGROUND

The present disclosure relates generally to the production of ceramic articles, and particularly to the production of ceramic articles using a steam assisted firing step.

Ceramics made by traditional processing consists of many organic ingredients including processing aides and lubricants (alkanes, alkenes, paraffins, fatty acids, etc.), forming agents as binders (methylcellulose, PVOH, etc.) and structural agents as pore formers (carbon and hydrocarbon-based materials such as starch, graphite, synthetic polymers, etc.). Firing/processing of ceramic products with large dimensions and complex shape is very difficult when high level of organic binders, lubricants and pore former are involved in the batch composition. This is because burning out of these chemicals is a vigorous and exothermic reaction in which the significant amount of heat is generated when converting carbon and/or hydrocarbon compounds with oxygen (air) to carbon dioxide and water. Oftentimes, the non-uniform burning out process occurring in the firing of ceramic parts creates a temperature difference and difference of expansion or shrinkage which induces an internal stress across the parts. This is the leading cause of firing cracks and deformations.

To improve the firing yields and eliminate temperature spikes during the burning out process, the current cellular ceramics manufacture processes have to reduce the oxidation rate (exotherm) by reducing the oxygen content in the atmosphere, such as by using large amounts of nitrogen to dilute the air, and/or prolonging the burning out stage with very low temperature ramping speed (<10° C./h) during the reaction range (150°-800° C.). Therefore, the slow speed of burning out of organics adds significant cost on the manufacture of cellular ceramics from both of materials and energy. For example, using conventional processes, it can take about 200 hours to fire a large frontal area (LFA) part (e.g., ≥10" diameter×13" height) having an organics content of about 15% (by super-addition) in the green part (e.g., 10% pore former+5% binder and lubricant). Moreover, it is extremely difficult to fire any LFA parts with more 25% of pore former using current production processes.

Thus it would be desirable to have a ceramics manufacturing process that shortened the time for the firing step.

SUMMARY

One aspect of the disclosure includes a process for producing a honeycomb ceramic article, the process comprising the addition of steam to the firing atmosphere during the firing cycle. The amount of steam added to the atmosphere throughout the firing cycle may be from about 10% to about 100% by volume.

In another aspect, the disclosure includes a cordierite ceramic article produced by providing cordierite ceramic-forming ingredients, a cellulose based binder, an aqueous based solvent and a pore forming agent, mixing the cordierite ceramic-forming ingredients, the binder, the solvent, and the pore forming agent to form a precursor batch, forming the precursor batch into a green honeycomb body and firing the green honeycomb body to produce the cordierite ceramic article, wherein steam is added to the kiln atmosphere during the top soak temperature of the firing cycle. The cordierite ceramic article has a ratio of orthorhombic cordierite to hexagonal cordierite of from about greater than about 7 to 1, greater than about 9 to 1, greater than about 15 to 1, or even greater than about 17 to 1. These high ratios of orthorhombic cordierite to hexagonal cordierite are achievable at fast cooling rates (e.g., greater than about 50° C./hour or even greater than about 100° C./hour) from the top soak temperature of the firing cycle.

In another aspect, the disclosure includes an aluminum-titanate ceramic article produced by providing aluminum-titanate-forming ingredients, a cellulose based binder, an aqueous based solvent and a pore forming agent, mixing the aluminum-titanate ceramic-forming ingredients, the binder, the solvent, and the pore forming agent to form a precursor batch, forming the precursor batch into a green honeycomb body and firing the green honeycomb body to produce the aluminum-titanate ceramic article, wherein steam is added to the kiln atmosphere during the top soak temperature of the firing cycle.

In another aspect, the disclosure includes an mullite ceramic article produced by providing mullite-forming ingredients, a cellulose based binder, an aqueous based solvent and a pore forming agent, mixing the mullite ceramic-forming ingredients, the binder, the solvent, and the pore forming agent to form a precursor batch, forming the precursor batch into a green honeycomb body and firing the green honeycomb body to produce the mullite ceramic article, wherein steam is added to the kiln atmosphere during the top soak temperature of the firing cycle.

Additional features and advantages of the claimed invention will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments that are intended to provide an overview or framework for understanding the nature and character of the invention as it is claimed. The accompanying drawings are included to provide a further understanding of the disclosure, and are incorporated into and constitute a part of this specification. The drawings illustrate various embodiments and together with the description serve to explain the principles and operations of the invention as claimed.

BRIEF DESCRIPTION OF THE DRAWINGS

FIG. 1A is a schematic showing the firing chamber for a firing cycle with no added steam in the incoming atmosphere.

FIG. 1B is a schematic showing the firing chamber for a steam assisted firing cycle.

FIGS. 2A and 2B illustrate the temperature differential within a part during a firing cycle without steam added to the atmosphere, and with steam added to the atmosphere, respectively.

FIG. 3 is an exemplary firing cycle used to demonstrate the impact of a steam assisted firing cycle.

FIGS. 11A and 11B compare the physical properties of cordierite structures fired with and without steam added to the input of the atmosphere.

DETAILED DESCRIPTION

Figure 4B:
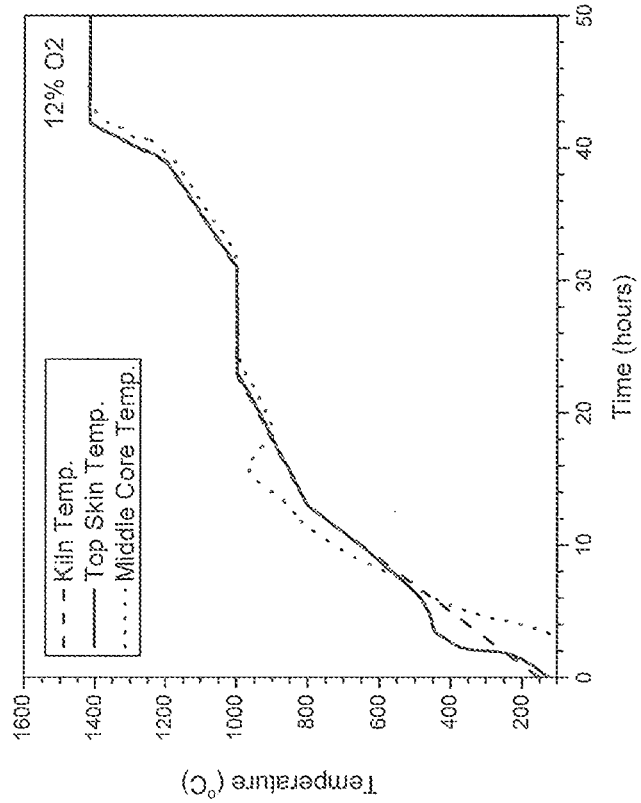
FIGS. 4A and 4B illustrate the impact of oxygen concentration on part temperature throughout the firing cycle without steam added to the atmosphere.

Broadly, the present disclosure provides a process for producing a ceramic article comprising the step of firing a ceramic article in the presence of steam. Instead of, or in addition to using oxygen, water (steam) is used as an oxidation agent to consume some or all of the organics and carbons in the green body throughout the burning out process. Thus, a highly exothermic oxidation reaction is avoided or reduced, since an endothermic water gas reaction and low exothermic water gas shift reaction are used to remove the carbon compounds. Moreover, the process described herein provides high porosity ceramic articles on a very fast heating and cooling ramping speed firing cycle, having heating and cooling rates in the range of 50-100° C./hour or faster, with some embodiments of the firing cycle having a total firing cycle time on the order of 30 hours. The experimental data show that heat flux generated from the steam assisted firing process is greatly reduced from the normal oxidation reactions from $O_2$. As a result, the steam assisted firing process can generate much higher manufacturing capacity for existing and new products with significant cost reduction.

The firing step of the process described herein is also believed to provide more complete ceramic formation using steam assisted firing, allowing for the shortening of the conventional long and high temperature firing cycles. By way of non-limiting example, the process described herein may decrease the firing cycle from greater than 200 hours in conventional firing processes to less than 60 hours, or even less than 50 hours with steam assisted firing.

The process described herein has many advantages over traditional firing processes with air ($O_2$). As is demonstrated in the examples presented below, the low reaction enthalpy ($\Delta H$) from the oxidation of organics in steam significantly increases the firing speed, reduces the temperature difference between the core and skin of the part, and improves the productivity and yield of the ceramic bodies so formed. The slower reaction speed of solid organics with gaseous steam reduces the heat flux generated from both the water gas (WS) reaction ($H_2O+C \rightarrow H_2+CO$) (which occurs at temperatures over about 600° C.) and the water gas shift (WGS) reaction ($H_2O+CO \rightarrow H_2+CO_2$). This also benefits (e.g., increases) the firing speed and improves the productivity and yield of the firing process. Productivity and yield may also be improved as steam is an inert gas at lower temperature (e.g., <250° C.). Lower boiling point organics will be physically distilled out from the green body by absorption of heat rather than generate a spike of heat from removal by oxidation reactions.

The presence of steam in the firing atmosphere has numerous other benefits. Steam can activate the oxides surfaces and accelerate the particle to particle reactions for sintering. This is because water is a "temporary" fluxing agent or viscosity modifier for the inorganic batch ingredients and allows the inorganic batch ingredients to combine faster to form the ceramic end-product and also leads to a higher crystalline structure. As described in greater detail below, steam can also favorably impact the microcrack formation process that leads higher thermal shock resistant for cordierite. Steam assisted firing can produce higher porosity ceramic end-product because the organic pore formers are completely removed at much higher temperatures in comparison with an atmosphere having oxygen but no steam. Finally, steam may behave like a plasticizer to reduce the internal stress for better ceramic morphology.

In one embodiment, there is provided a method for making a ceramic article wherein the method comprises a steam assisted firing step. A ceramic precursor batch may be formed from the desired inorganic ceramic-forming materials and any other organic additives desired such as, but not limited to, binders, pore forming agents or lubricants and a solvent. The ceramic precursor batch may then be shaped, usually by molding or extrusion, to form a green body. The green body is then dried before being sintered or fired. The terms "sintering" and "firing" will be used interchangeably herein. The steam assisted firing step comprises adding $H_2O$ in the form of water or steam during the firing of the ceramic article. The green body is placed in a chamber (i.e., kiln) and the temperature is ramped up. A schematic illustration of a firing chamber 10 is shown in FIGS. 1A and 1B. FIG. 1A illustrates a conventional firing chamber in which removal of organics results in the release of large amounts of heat from the oxidation process. In FIG. 1B, steam is introduced into the chamber 10 (e.g., through an inlet or other suitable source) once the heating element 12 (e.g., an electric coil, gas burner, or the like) has raised the temperature in the firing chamber to at least 100° C., the boiling temperature of water at 1 atmosphere pressure.

As noted above, the $H_2O$ may be added in the form of steam or as water. If added as water, it should be added in a form, such as a fine mist, that will immediately be converted to steam. Herein, the terms "water" and "steam" will be used interchangeably. In one illustrative embodiment, the amount of steam is from about 10% to about 100%, based on volume of total gasses of the firing chamber. In another illustrative embodiment, the amount of steam is from about 10% to about 60%, based on volume of total gasses of the firing chamber. In yet another illustrative embodiment, the amount of steam is from about 20% to about 60%, based on volume of total gasses of the firing chamber. In yet another illustrative embodiment, the amount of steam is from about 40% to about 60%, based on volume of total gasses of the firing chamber. The steam may be mixed with other gasses including, but not limited to, air, oxygen, nitrogen or a combination thereof.

FIGS. 2A and 2B illustrate the firing of an exemplary cordierite ceramic article in air and 100% steam, respectively, and correspond to use of the firing chambers 10 of FIGS. 1A and 1B, respectively. Referring to the temperature profiles in FIGS. 2A and 2B, once the green body (the "part") is placed in the firing chamber, the temperature 20 within the firing chamber is ramped up by engaging the heat source 12 (e.g., electric heating element, gas burner, or the like). The temperature may be ramped up to the top soak firing temperature 22 (referred to herein as the "property forming region"), usually from about 1200° C. to about 1500° C., depending on the ceramic material being used.

The parts used in the firing cycle examples of FIGS. 2A and 2B comprised large frontal area (LFA) cordierite parts having an 11 inch (28 cm) diameter and height of 13 inches (33 cm). The part geometry was 275 cells/in$^2$ (cpsi) (42.6 cells/cm$^2$) with a 14 mil (356 µm) cell wall thickness. The cordierite composition used in the examples of FIGS. 2A and 2B comprised the following inorganic materials (by weight percent), as well as the following super addition of organic materials (by weight percent super addition of the organic material to the total inorganic batch weight):

| Inorganics | Weight % | Organics (super-addition) | Weight % |
|---|---|---|---|
| Silica | 16.6 | Cross-linked potato starch | 22 |
| Alumina | 28.0 | Graphite | 22 |
| Kaolin clay | 13.9 | Methylcellulose | 6 |
| Talc | 41.5 | Sodium stearate | 1 |
| | 100% | | |

Weight percent super addition of the organic material to the total inorganic batch material weight means herein and as shown for the example in the above table, that for every 100 Kg of inorganic batch ingredients (silica, alumina, kaolin clay and talc, combined), 22 Kg each of cross-linked potato starch and graphite, 6 Kg of methylcellulose and 1 Kg of sodium stearate are added.

The firing cycle of FIG. 2A is exemplary of prior art firing cycles. Specifically, in the absence of steam, the burning out of the organic materials in the green body (including pore forming agents such as starch and graphite) as the temperature is being ramped up is exothermic. In FIG. 2A, exothermic events 26, 28 associated with the burnout of starch and graphite, respectively, can be seen in the plot of temperature differential 24 (showing the difference between the temperature at the core of the part and at the top skin of the part). Therefore care must be taken to ramp up the chamber temperature slowly enough to avoid excessive stress within the part, such as may be caused by extreme temperature differentials 24 to avoid cracking of the part. As a result of the slow ramping speeds required to maintain a low temperature differential, the firing cycle of FIG. 2A is in excess of 200 hours long. As used herein, the term "cracking" refers to macro cracking of the parts (as distinguished from microcracking as characterized by the microcracking parameter Nb$^3$ defined below) resulting in cracks that have a length in excess of, for example, about 2 cm and are considered defects within the part.

In contrast, referring to FIG. 2B, in the presence of steam, the firing chamber temperature 20 may be ramped up at a very fast ramping speed while avoiding macro cracking of the part. By way of non-limiting example, the ramping speed may be from about 50° C./hour to about 200° C./hour, although slower ramp rates may be preferred, e.g., in the temperature range from about 200° C. to about 500° C., for compositions having organic content greater than about 35 weight % (by super addition). In FIG. 2B, the firing cycle includes a straight ramp to the top soak temperature 22, and a total cycle time of less than 60 hours.

The presence of steam during the firing cycle changes the reaction chemistry in the elimination of organic and carbon compounds, and the burning out of pore forming agents such as starch and graphite is slightly endothermic (FIG. 2B). The lack of an exothermic reaction (see, e.g., temperature differential 24 in FIG. 2B) may result in ceramic articles that are free of macro cracks, while beneficially having a high microcrack parameter Nb$^3$.

The microcrack parameter Nb$^3$ is derived from the modulus of elasticity (E$_{mod}$) heating and cooling curve between room temperature and 1200° C. and is an indirect measure of the microcrack volume of the article. Nb$^3$ is calculated as:

$$Nb^3 = \frac{\left[\frac{E_0}{E} - 1\right]}{1.8},$$

where E is the elastic modulus of the article at room temperature with microcracks (i.e., after exposure to a microcracking condition), E$_0$ is the elastic modulus of the article at room temperature without microcracks (i.e., before exposure to a microcracking condition), N is the number of microcracks and b is the average length of a microcrack. The microcrack parameter Nb$^3$ is measured in units of volume given that the average crack length b, is cubed. (D. P. H. Hasselman and J. P. Singh (1979) "Analysis of Thermal Stress Resistance of Microcracked Brittle Ceramics," Ceramic Bulletin, 58 [9], 856-860).

As noted above, the presence of steam during the firing of the ceramic article may result in a significantly shorter firing cycle. The time required to fire a part is dependent upon a number of factors, including but not limited to part size, part geometry (e.g., cell density, wall thickness, etc.), pore former type and level, lubricant type, etc. For a part having a volume of about 4 liters and an organics content of greater than about 13% weight (absolute) or greater than about 15% weight by super addition, total firing cycle times less than about 100 hours can be achieved. In one illustrative embodiment, the total time of the firing cycle is from about 25 hours to about 100 hours. In an alternate illustrative embodiment, the total firing cycle is from about 30 hours to about 60 hours.

An exemplary firing cycle suitable for producing parts free of macro cracks is shown in FIG. 3. The firing cycle of FIG. 3 is 62.3 hours in length. The temperature profile 20 includes a 50° C./hr ramping rate to remove organics from 110° C. to 800° C., then a 20° C./hr ramping rate from 800° C. to 1000° C., and a hold at 1000° C. for 10 hours to move all carbon. The sintering process starts at 1200° C. after ramping from 1000° C. at 60° C./hour, then quickly ramping to the peak (i.e. "top soak") temperature of 1420° C. at 75° C./hr and holding at that peak temperature for 10 hours. Cooling comprises a 50° C./hour decrease to 1100° C. and then cooling to 110° C. at a 300° C./hr rate. The firing cycle of FIG. 3 is used for the examples of FIGS. 4-7 described below.

Table 1 and FIGS. 4-8 illustrate the impact of the use of steam during the firing cycle at various concentrations of oxygen (O$_2$) and steam (H$_2$O). To demonstrate the role of steam on the firing reaction kinetics and thermodynamics, steam is mixed with different level of oxygen between 2% and 12%. The thermocouple readings reveal a general trend of the impact of steam on the heat of combustion and the relative speed of reactions.

TABLE 1

| $O_2$ (%) | $H_2O$ (%) | Crack Read | Carbon Burn off (hours) | Porosity (μm) | Pore size (μm) | Pore distribution $(d_{50} - d_{10})/d_{50}$ | CTE $(\times 10^{-7}/C)$ | MOR (Psi) | EMod $(\times 10^5 \text{ Psi})$ |
|---|---|---|---|---|---|---|---|---|---|
| 0 | 100 | Crack free | 23.8 | 62.5 | 9.7 | 0.40 | 9.9 | 213 | 2.21 |
| 2 | 0 | Cracked | 52.0 | 59.9 | 17.2 | 0.23 | 16.5 | 365 | 2.80 |
| 4 | 0 | Cracked | 33.9 | 60.1 | 15.2 | 0.26 | 15.8 | 360 | 2.92 |
| 6 | 0 | Cracked | 25.9 | 61.4 | 15.8 | 0.24 | 16.3 | 162 | 2.34* |
| 12 | 0 | Cracked | 18.5 | 60.5 | 16.8 | 0.26 | 16.8 | 382 | 2.92 |
| 2 | 20 | Crack free | 25.3 | 58.7 | 15.7 | 0.26 | 15.5 | 338 | 2.55 |
| 2 | 40 | Crack free | 22.6 | 61.5 | 13.2 | 0.30 | 13.9 | 228 | 2.24 |
| 2 | 60 | Crack free | 22.4 | 61.6 | 12.2 | 0.35 | 15.5 | 215 | 2.25 |
| 4 | 20 | Crack free | 24.0 | 59.7 | 15.0 | 0.27 | 13.4 | 293 | 2.47 |
| 4 | 40 | Crack free | 21.1 | 61.4 | 13.6 | 0.32 | 13.7 | 267 | 2.26 |
| 6 | 30 | Crack free | 19.7 | 59.4 | 14.8 | 0.28 | 14.4 | 328 | 2.55 |
| 12 | 30 | Crack free | 17.8 | 59.1 | 15.7 | 0.29 | 9.9 | 371 | 2.68 |

Table 1 summarizes the crack read, carbon burn-off time, and physical properties of a single part when subjected to the firing cycle of FIG. 3 with a firing atmosphere having the stated concentrations of oxygen ($O_2$) and steam ($H_2O$). It can be seen that the parts fired at oxygen concentrations of 2%, 4%, 6% and 12% all cracked in the absence of steam. However, the crack behavior was noted to be different at the different oxygen concentrations. Specifically, at 2% oxygen, severe surface cracks were observed and attributed to observed incomplete oxidation of carbon at the middle core of the part (a result of the short firing period). Although not shown in Table 1, a crack free part was obtained at 2% $O_2$ when an additional 30 hours was added to the firing cycle (for a total cycle length of 93 hours) at 1000° C. to remove all of the carbon. At 4% oxygen and no steam, a hairline crack at the top surface was identified, and the middle core carbon was completely removed. At 6% oxygen and no steam, no crack was observable by the naked eye. However, the MOR measurement is less than 30% of normal values and, therefore, a significant structure flaw is presumed to exist in the fired part. At 12% oxygen and no steam, skin cracks are observed, and may be caused by the fast oxidation of starches due to the high concentration of oxygen.

In comparison, crack free parts were obtained from all of the firing conditions when steam was introduced into the firing atmosphere, for oxygen concentrations of 0%, 2%, 4%, 6% and 12%, and steam concentrations of 20%, 3%, 40%, 60% and 100%, as set forth in Table 1, and described below with respect to FIGS. 5-8.

As set forth in Table 1, as control experiments, firing studies were carried out with a firing atmosphere having 2%, 4%, 6% and 12% oxygen concentrations and no steam to demonstrate the impact of oxygen concentration on the organic material oxidation rate. The impact of oxygen concentrations of 4% and 12% (representative of low and high oxygen concentrations in a gas kiln) on part temperature are shown in FIGS. 4A and 4B.

At an oxygen concentration of 4% (FIG. 4A), the top skin temperature data shows a slow carbon oxidation reaction (rising above the kiln temperature) starting at about 250° C. with a small and smooth exothermic event extending to temperatures up to about 1000° C. At the same time, the middle core temperature remains below the kiln temperature until about 850° C., then rises above the kiln temperature until the residual carbon at the middle of core is completely burn off after about 33 hours, at which time the middle core temperature approaches the kiln temperature.

In comparison, at a higher oxygen concentration of 12% (FIG. 4B), the top skin temperature shows a dramatic temperature increase at about 250° C., evidencing a large exothermic event, then quickly approaches the kiln temperature at about 550° C. At the same time, the middle core temperature indicates the start of an oxidation reaction around 550° C. that continues until the occurrence of a significant temperature spike at about 850° C., at which time the middle core temperature approaches the kiln temperature, indicating that the carbon is completely combusted after only about 18 hours firing time (e.g., 15 hours short than that of the 4% oxygen condition of FIG. 4A).

Figure 4A:
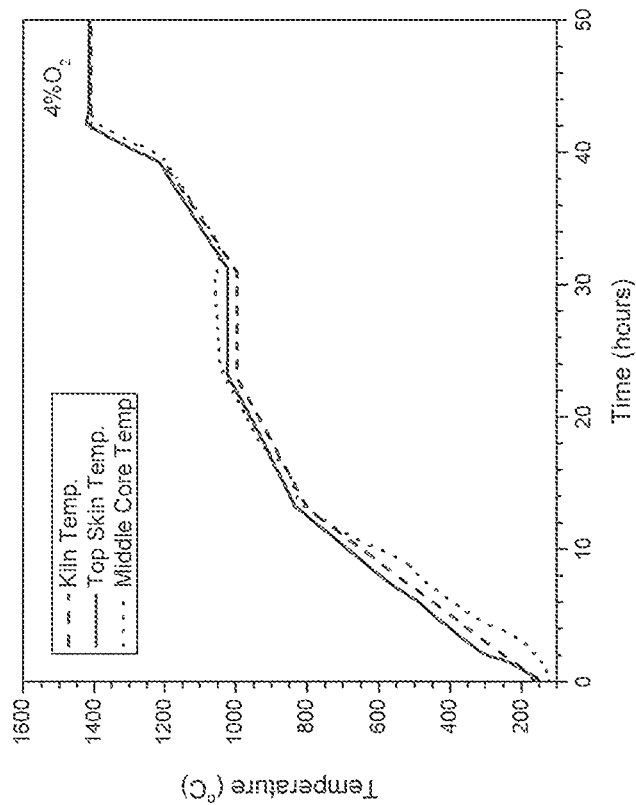

The data of FIGS. 4A and 4B indicate that the organic starch material (methocel) present at the top skin and middle core locations undergoes two completely different reactions as described by the following chemical equations:

At the top skin with high oxygen concentrations, the starch burns immediately, similar to a wood combustion reaction (reaction 1) in air. This combustion process is a classic fast radical chain reaction with significant heat produced:

$$C_6H_{10}O_5 + O_2 = CO_2 + H_2O + 2834 \text{ kJ/mol}(17.5 \text{KJ/g}) \quad (1)$$

At the middle core, the exothermic reaction is a carbon oxidation reaction, similar to the burning of carbon in the air (reaction 2). The carbon oxidation reaction generates high energy and takes placed at higher temperatures:

$$C + O_2 = CO_2 + 393.5 \text{KJ/mol}(32.8 \text{KJ/g}) \quad (2)$$

It is surmised that carbon is formed at the middle core location due to the spontaneous combustion of starch at the top skin, which leaves an oxygen starving condition for the middle core location. The resulting formation of char in the middle core from a starch dehydration reaction during the firing process is similar to the approach of producing charcoal by heating wood (reaction 3) in a enclosed kiln without oxygen:

$$C_6H_{10}O_5 = 6C + 5H_2O \quad (3)$$

Reactions (1), (2), and (3) are strongly dependent on the oxygen concentration. Low oxygen concentrations reduce the rate of reactions (1) and (2), while increasing the probability of reaction (3). Thus, low oxygen is beneficial for reducing the heat flux at the cost of prolonging the firing cycle.

As shown from the oxidation reactions in (1), (2) and (3), steam concentration can be a useful influence on the oxidation reactions since steam ($H_2O$) is a product gas of the starch combustion reaction (1) and the starch dehydration reaction (3). In comparison with the carbon oxidation reaction (2), additionally, $H_2O$ can directly engage in the coal gas reactions to produce hydrogen by absorption of the heat (reaction 4):

$$C + 2H_2O = CO_2 + 2H_2 - 89.7 \text{KJ/mol}(-7.48 \text{ kJ/g}) \quad (4)$$

Figure 5:
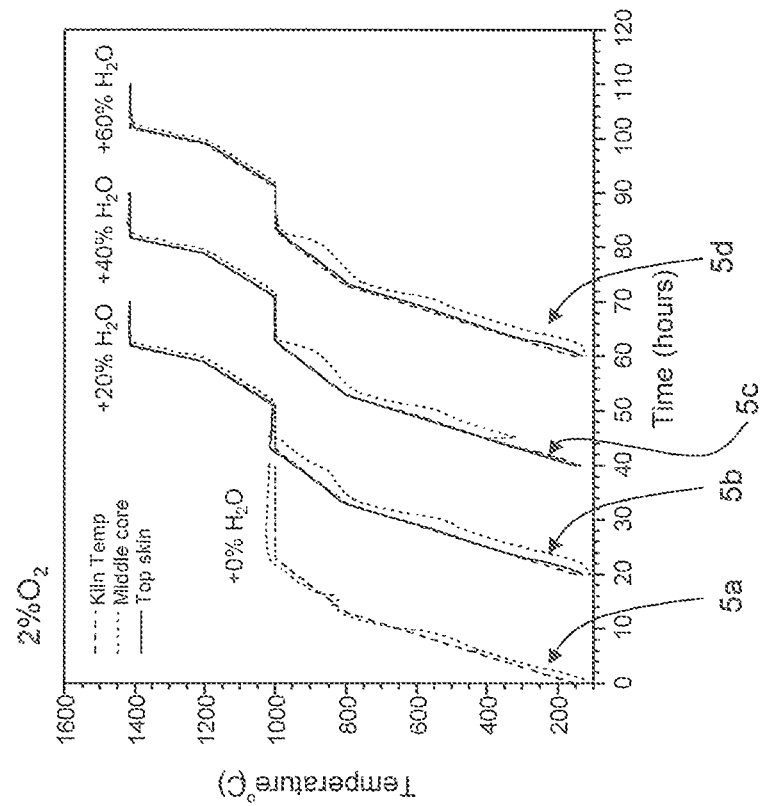
FIG. 5 illustrates the impact of a steam assisted firing cycle in a 2% oxygen atmosphere.

Referring to FIG. 5, the oxygen concentration is 2%. Four steam conditions are shown, for 0%, 20%, 40% and 60% steam (graphs 5a, 5b, 5c, and 5d, respectively). Steam accelerates the organic removal rate as the carbon burn off time from the middle core thermocouple readings is cut short significantly with the increase of the steam concentration. For example, without any steam, at about 40 hours of firing, the middle core temperature in FIG. 5a is still higher than that of the kiln temperature, thereby indicating that the exothermic carbon oxidation reaction with oxygen is still not complete. However, with addition of only 20% of steam, it takes 25.3 hours to burn off all the carbon in the middle core (graph 5b). At 60% of steam, the carbon is completely removed before kiln temperature reaches 1000° C. after only 22.3 hours of firing (graph 5d). Steam therefore accelerates the pore former removal reaction process for fast firing of ceramics from the prospective of reaction kinetics. Moreover, another positive result is the steam also has a positive impact on the reaction thermodynamics of pore former removal, i.e., steam can reduce the heat of combustion even at these higher reaction rates. As can be seen by comparing the middle core temperature of graph 5a with that of graphs 5b-d during the carbon removal reactions around 700°-1000° C., the addition of 20% steam in 2% $O_2$ completely altered the thermal profile of carbon oxidation reaction from an exothermic reaction (middle core temperature is higher than the kiln temperature) to endothermic reaction (middle core temperature is lower than the kiln temperature).

Figure 6:
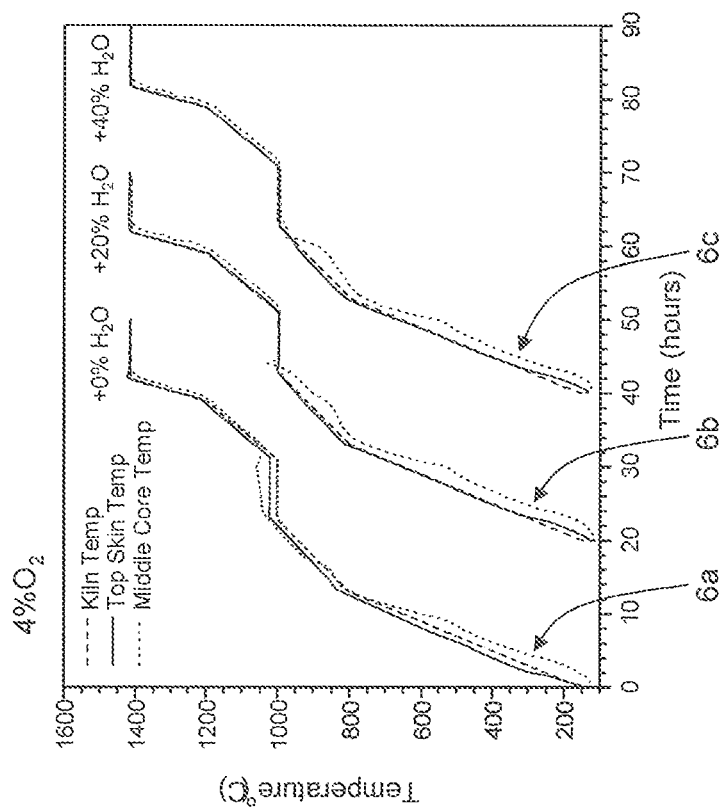
FIG. 6 illustrates the impact of a steam assisted firing cycle in a 4% oxygen atmosphere.

In FIG. 6, the oxygen concentration is 4%. Graphs 6a, 6b, and 6c show three firing conditions in which the steam concentration is 0%, 20%, and 40%, respectively. Similar to the conditions of FIG. 5 above (i.e., 2% of oxygen), steam clearly accelerates the organic removal rate as the carbon burn off time from the middle core thermocouple readings is cut short as the steam concentration increases. For example, adding 20% and 40% steam to a 4% oxygen atmosphere reduced carbon removal time at the middle core from 33 hours to 26 hours, and 22 hours respectively. Since the carbon is completely removed before reaching 1000° C. with 40% steam, the 10 hour hold at 1000° C. is not needed for the firing cycle and could be eliminated. The graphs of FIG. 6 show a positive thermodynamics impact as described with respect to FIG. 5, i.e., the addition of 20% or greater steam in 4% oxygen can completely alter the thermal profile of carbon oxidation reaction (from 700°-1000° C.) from an exothermic reaction (middle core temperature is higher than the kiln temperature) to an endothermic reaction (middle core temperature is lower than that of kiln temperature).

Figure 7:
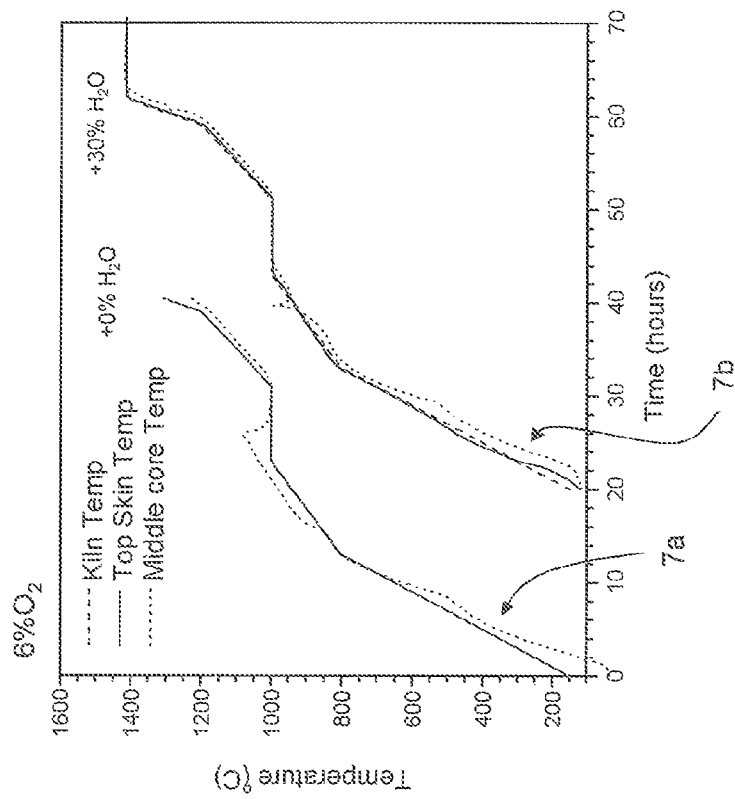
FIG. 7 illustrates the impact of a steam assisted firing cycle in a 6% oxygen atmosphere.

In FIG. 7, the oxygen concentration is 6%. Graphs 7a and 7b illustrate the addition of 30% steam impacts reaction kinetics and thermodynamics similar to that described above for 2% and 4% oxygen levels (FIGS. 5 and 6, respectively). Specifically, the firing time for removal of carbon is reduced from 25.9 hours to 19.7 hours. The reaction is still endothermic around 800° C. then becomes exothermic at about 900° C.

Figure 8:
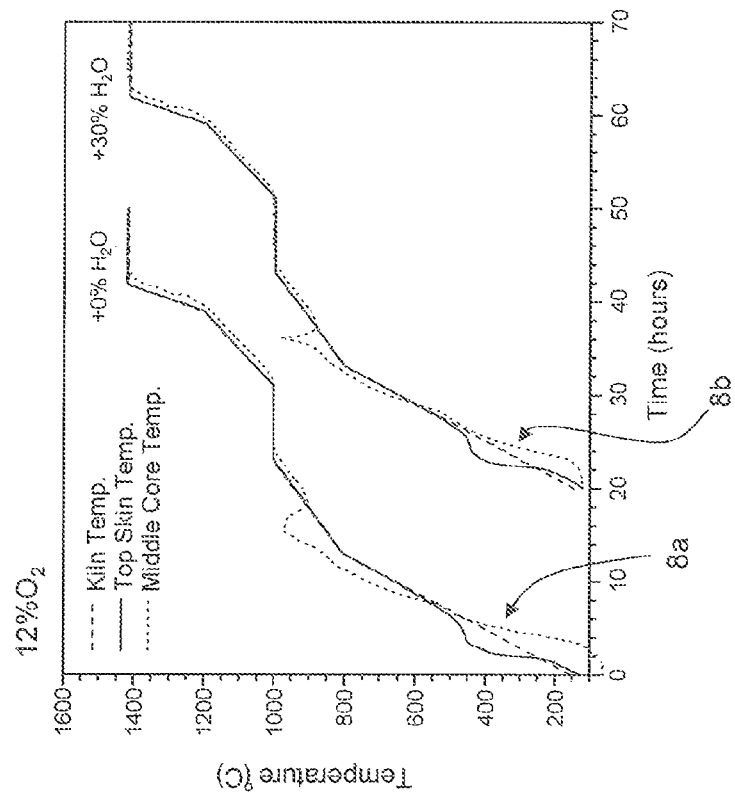
FIG. 8 illustrates the impact of a steam assisted firing cycle in a 12% oxygen atmosphere.

In FIG. 8, the oxygen concentration is 12%, which is about the highest oxygen concentration that can be obtained in a gas kiln because the oxygen concentration in the air is 21%, and part of the oxygen is consumed by fuel from the gas combustion process. In comparison to FIG. 7, the addition of 30% steam showed only marginal impact on reaction kinetics as the carbon removal time reduced less than one hour (from 18.5 hours to 17.8 hours). Unlike the other firing condition of 2%, 4% and 6% oxygen, 30% steam did not alter the carbon/oxygen oxidation reaction as the middle core remained exothermic at temperatures above 600° C. However, it can be seen that the heat flux is reduced at the temperatures below 850° C., as the temperature difference between the middle core and top skin is much less in the case of 30% steam.

The examples of FIGS. 5-8 demonstrate the usefulness and desirability of the introduction of steam into the firing atmosphere during the organics removal portion of the firing cycle. In one embodiment, steam is introduced into the firing atmosphere only during the organics removal portion of the firing cycle (i.e., below about 1000° C.) to achieve the benefits described herein. In other embodiments, steam may be introduced at the property forming region of the firing cycle (i.e., at top soak temperatures).

Based on thermodynamics of reactions (2) and (4) above, a mixed gas (i.e., $O_2+H_2O$) kiln atmosphere may be identified that enables a fast carbon removal reaction rate with minimal heat generation. The first step for this process is to identify the highest possible oxygen and steam concentration (i.e., the maximal carbon removal power) with minimal heat generation for a specific reaction temperature.

The carbon removal time will heavily influence the overall length of a firing cycle. Carbon removal time is a function of the kiln atmosphere oxygen and steam concentrations for a particular firing cycle. Since the balance of kiln atmosphere gas is nitrogen (e.g., air) which is an inert component, the carbon removal time is a function of both oxygen and steam concentration. Based on the data from Table 1, a contour plot of the carbon removal time with varying oxygen and steam concentrations can be used to generate a matrix table by the Renka-Cline algorithm method to produce a contour plot using data analysis and graphing software, such as OriginLab 7.5, available from OriginLab Corporation of Northampton, Mass., USA. The correlation of carbon burn off time with varying concentrations of $H_2O$ and $O_2$ are contour plotted in FIG. 9. This mathematic approach can be used to resolve a reaction rate dependence on the two variables of $O_2$ and $H_2O$.

Figure 9:
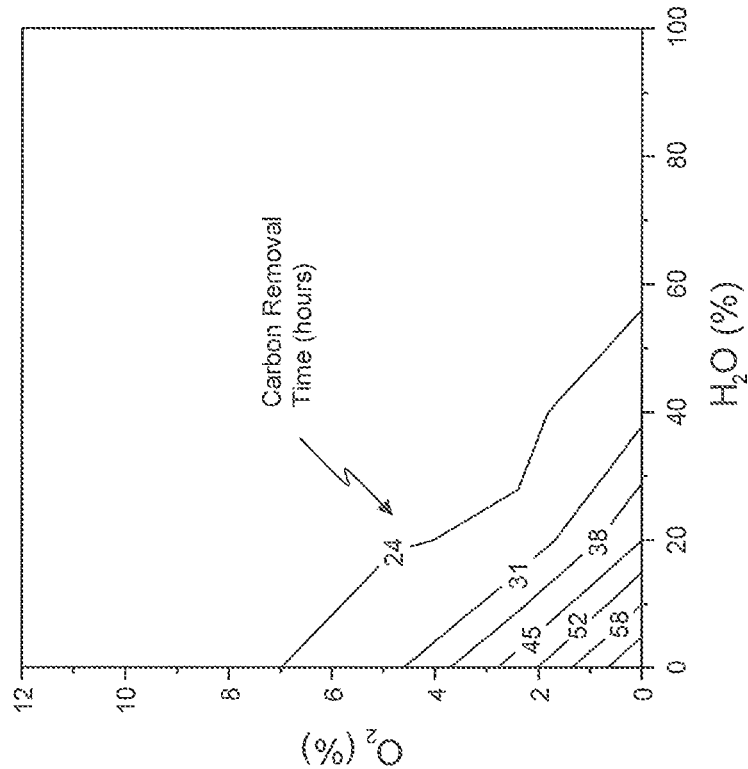
FIG. 9 illustrates the impact of oxygen and steam concentrations on carbon removal time.

As shown in FIG. 9, the carbon removal time (T) decreases with increases of either oxygen or steam concentration (or both). In the mixing of $O_2$ with $H_2O$, a shorter carbon removal time is always observed as compared with $O_2$ and $H_2O$ alone. By following each contour line with the same carbon removal time, a prediction can be made for the overall firing cycle length of $O_2$ alone (no steam) and for a mixed gas ($O_2$ and $H_2O$) condition. For example, the carbon removal time for the 7% oxygen and 0% $H_2O$ condition is about 24 hours; the same carbon removal time can be realized by use of a firing atmosphere having approximately 4% $O_2$ and 20% $H_2O$, or 2% $O_2$ and 40% $H_2O$, for example.

The mathematic modeling of the experimental data for reaction time and oxygen concentration reveals that the time for complete carbon removal (TCR) is an exponential decay function of the oxygen concentration. Based on the contour plot data and experimental results of different $O_2$ concentrations, the overall organic/oxygen reactions (1) and (4) above can be fit at the part scale by first order chemical reactions to achieve the following equation:

$$T_{CR}/O_2 = 16.9 + 71 \cdot \exp(-[O_2]/k_{O2}) \tag{5}$$

in which $T_{CR}/O_2$ is the carbon removal time for an $O_2$ atmosphere (in hours), $[O_2]$ is the concentration of oxygen (in %), and $k_{O2}$ is the observed reaction constant of oxygen. Based on the contour plot data and experimental results of different $O_2$ concentration, $k_{O2}=2.85$.

Similar modeling confirms that the carbon removal time is also an exponential decay function of steam concentration. Therefore, the overall reactions of organic material with steam at the part scale is also a first order reaction which can be written as:

$$T_{CR}/H_2O = 21.7 + 58 * \exp(-[H_2O]/k_{H_2O}) \quad (6)$$

in which $T_{CR}/H_2O$ is the carbon removal time for an $H_2O$ atmosphere (in hours), $[H_2O]$ is concentration of steam (in %), and $k_{H_2O}$ is the observed reaction constant of steam. The relative reaction rate constant of oxygen and steam on organics removal reaction is about 7.5:1, i.e., $K_{O_2}/K_{H_2O}=7.5$. Considering a organic removal rate, adding 30% steam in the firing process is estimated to equal an increase of about 4% (30/7.5) of the oxygen concentration, resulting in a significant increase of the organic pore former removal rate during the firing process.

With the addition of steam to the firing process, it is possible to identify a carbon removal reaction condition that enables the fastest possible reaction rate with minimal heat management based on the thermodynamics of reactions (2) and (4). That is, at a suitable ratio of oxygen/steam concentration, the overall carbon removal reaction could reach a thermally neutral condition as all of the heat generated from the carbon/oxygen oxidation reaction can be absorbed by the carbon/water reaction. From reactions (2) and (4), if the carbon/water reaction rate divided by the carbon/oxygen reaction rate is 32.8/7.48=4.4, the overall carbon removal reaction could be close to thermally neutral.

Figure 10:
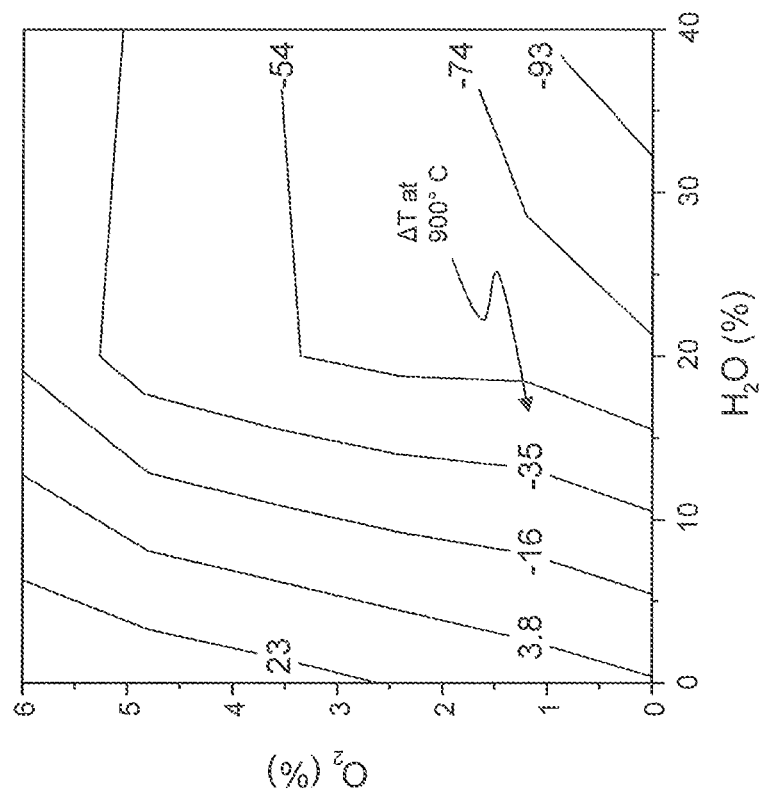
FIG. 10 illustrates the impact of oxygen and steam concentrations on the temperature difference between the top skin and middle core locations of a part during a firing cycle.

To identify an optimal heat management condition, a mathematic process similar to the carbon removal time calculation is performed on $\Delta T$ (the difference between the top skin and middle core temperatures) at the kiln temperature of 900° C. The $\Delta T$ dependence on $O_2$ and $H_2O$ concentration is contour plotted in FIG. 10. In general, higher oxygen concentrations produce a positive change to the $\Delta T$, while higher steam concentrations urge a negative change to the $\Delta T$. As a result, a desired $\Delta T$ condition at 900° C. can be calculated from the contour plot. For example, a 4% $O_2$ and 8% $H_2O$ atmosphere could produce a $\Delta T=0$ condition at 900° C. Following the same contour line, a 6% $O_2$ and 14% $H_2O$ atmosphere could also achieve a $\Delta T=0$ condition, etc. In the plot, a zero $\Delta T$ condition is almost impossible to produce in an oxygen only (no steam) condition.

The example of thermal dynamic analysis for the reaction at 900° C. is applicable to any defined temperature (700, 800, 1000° C., etc.). Following this method, a firing cycle and ramping rate can be designed for a desired heat management condition using a dynamic ratio of steam and oxygen for the fastest possible carbon removal.

Use of steam in the firing step may also produce a ceramic article with more desirable properties than a ceramic article fired without steam. FIGS. 11A and 11B show the differences in a number of properties between cordierite structures fired either with or without steam during the property forming region at the top soak temperature 22. The composition of FIGS. 11A and 11B included 30% starch, 6% methylcellulose, and 1% sodium stearate.

Among the improved properties with the use of steam during the property forming region are reduced shrinkage of the cordierite structure, and a lower coefficient of thermal expansion (CTE). Related to the lower CTE is the increased density of microcracks in the steam fired cordierite structure, as quantified by the microcrack parameter $Nb^3$. This increase in microcracks aid retaining structural integrity of the cordierite structure when exposed to increased temperatures.

Figure 12B:
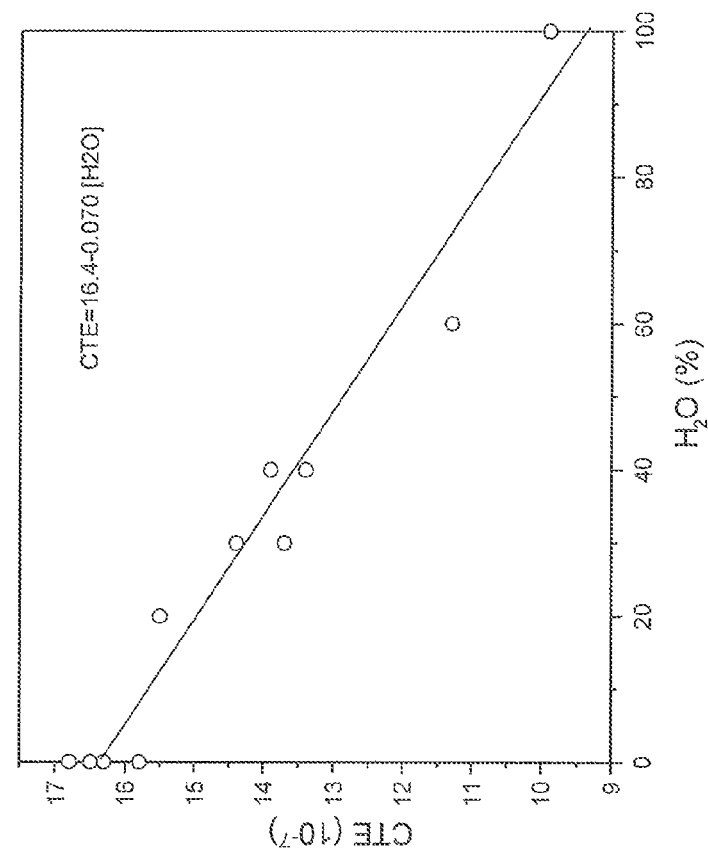
FIGS. 12A and 12B illustrate the influence of steam and oxygen concentration on the coefficient of thermal expansion of cordierite.
Figure 12A:
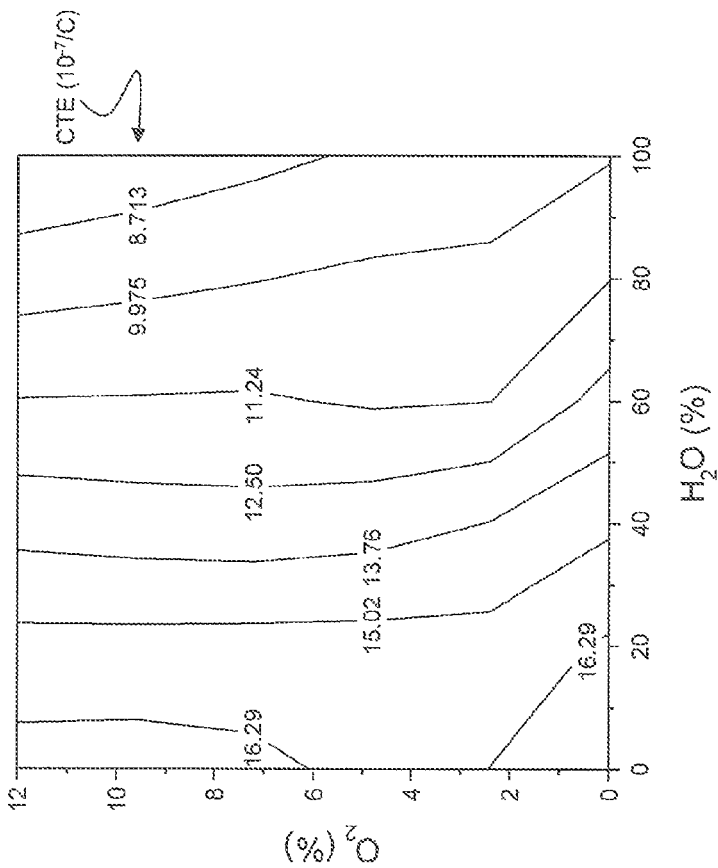

As shown in FIGS. 12A and 12B, steam concentration is directly linked to the reduction of CTE, while the influence of oxygen concentration is comparably very small. As seen in FIG. 12B, the CTE of cordierite linearly decreases with steam concentration. A linear fitting of the experimental data suggested that a 10% increase in the concentration of steam can reduce the CTE by 0.7×10-8/C.

Figure 13:
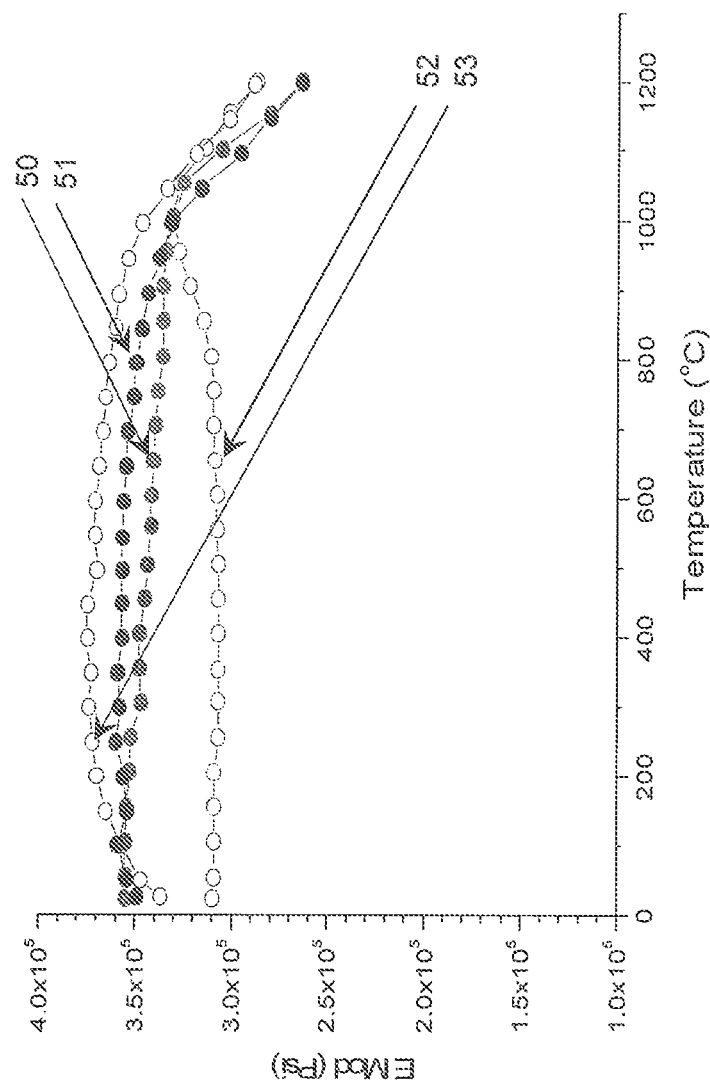
FIG. 13 is a graph showing the effect of steam assisted firing on the $E_{Mod}$ of a cordierite structure.

The elastic modulus ($E_{Mod}$) is another indicator of favorable microcrack improvements. FIG. 13 shows the effect of steam assisted firing on $E_{Mod}$ for a cordierite structure, and compares the heating and cooling cycles 50, 51, respectively, of Composition 1 fired in air, with the heating and cooling cycles 52, 53, respectively, of Composition 1 fired with steam at the property forming region.

Figure 14A:
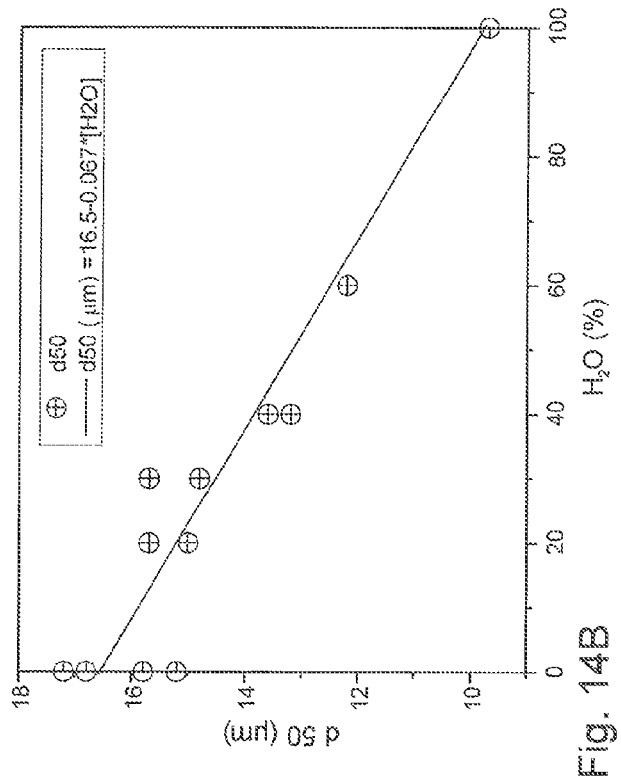
FIGS. 14A, 14B and 14C illustrate the influence of steam and oxygen concentration on the mean pore size and pore size distribution of cordierite.
Figure 14B:
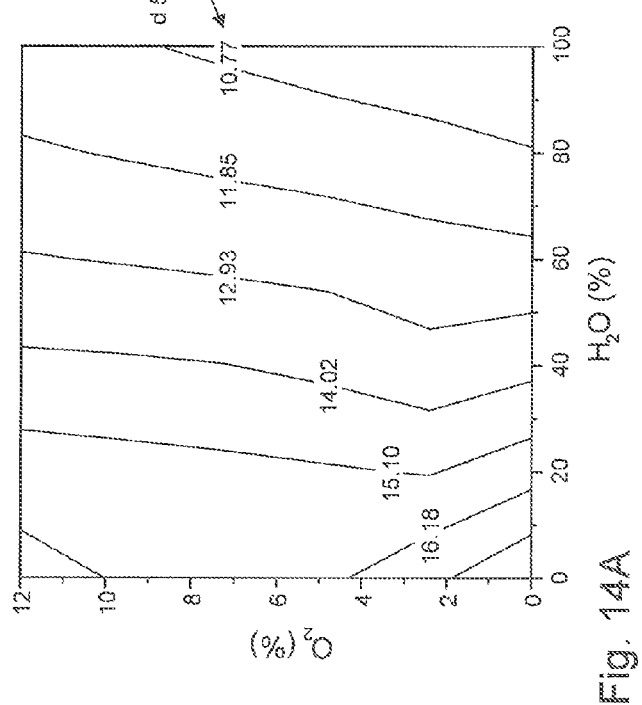
Figure 14C:
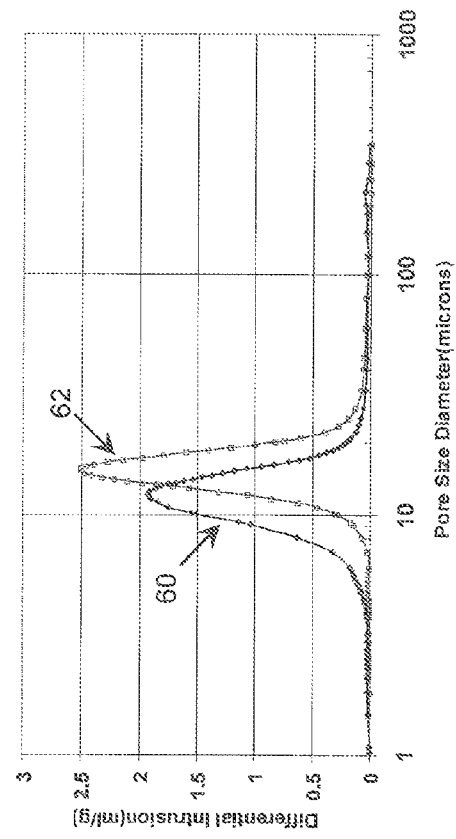

A further advantage of using a steam assisted firing step to make a ceramic article may be the resulting pore size distribution in the ceramic article. FIGS. 14A through 14C illustrate the impact of steam and oxygen on cordierite properties. FIG. 14A shows a contour plot of oxygen and steam influence on the mean pore size of cordierite using the d50 data in Table 1. In FIG. 14A, it can be seen that steam concentration has a significant impact on the cordierite mean pore size, while the influence of oxygen concentration is comparatively very small. As shown in FIG. 14B, the mean pore size linearly decreases with an increase of the steam concentration. A linear fitting of the experimental data suggested that a 10% increase of steam concentration can reduce the mean pore size by 0.67 micron. Referring to FIG. 14C, a ceramic article formed by a steam assisted firing cycle with Composition 1 has a pore distribution (shown as curve 60) that is smaller than a pore size distribution of a ceramic article fired without steam at the property forming region of the firing cycle (shown as curve 62). Curve 62 shows a porosity of 57.5%, and a mean pore diameter (d50) of 15.5 µm. In contrast, curve 60 shows a porosity of 60.3%, and a mean pore diameter (d50) of 11.8 µm. Therefore, the addition of steam to the firing cycle in the property forming region may assist in controlling the pore size distribution in the ceramic article.

Table 2 below shows the microstructure differences between different cordierite samples when fired in an air atmosphere and when fired in a steam atmosphere. For each of the examples in Table 2, the firing cycle utilized a cooling rate of 50° C./hour from top soak to about 1100° C., and greater than 100° C./hour from about 1100° C. to about 400° C., as illustrated in FIG. 3.

TABLE 2

| | Sample firing condition: | | |
|---|---|---|---|
| | Comp 1 fired in air | Comp 1 fired in steam | Comp 1 fired in steam |
| Sample Location | Middle core | Middle core | Middle core |
| Diameter x | 5.66x | 5.66x | 11x |
| Length/CPS/Web Thickness | 6/275/8 | 6/275/8 | 13/275/8 |
| Peak Temp. (C.)/ Ramping rate (C./h) | 1420/50 | 1420/50 | 1420/50 |
| Porosity (%) | 57.5 | 60.3 | 61 |
| d50 (µm) | 15.5 | 11.8 | 9.6 |
| d10 (µm) | 11.8 | 7.7 | 5.9 |
| d90 (µm) | 22.6 | 18.6 | 13.1 |
| Nb3 (microcracks) | 0.005 | 0.157 | 0.208 |
| Cordierite-Orthorhombic (%) | 74.7 | 89.9 | 83.5 |
| Cordierite-Hexagonal (%) | 14.8 | 5.2 | 9.6 |
| Orthorhombic/Hexagonal Ratio | 5.0 | 17.3 | 8.7 |
| Spinel/Sapphirine/Mullite (%) | 1.1/3.5/0.2 | 0.9/3.2/0.1 | 0.9/3.0/0.2 |
| Amorphous Phase (%) | 5.6 | 0.8 | 2.7 |

Composition 1 of Table 2 and FIGS. 8-14 comprises the following inorganic materials (by weight percent), as well as the following super addition of organic materials (by weight percent):

TABLE 3

| | | COMPOSITION 1 | Weight (%) |
|---|---|---|---|
| Inorganics: | | Talc | 41.54 |
| | | Silica | 16.59 |
| | | Clay | 13.85 |
| | | Alumina | 27.93 |
| Organics: (super addition) | | Cross-linked corn starch | 30.00 |
| | | Methylcellulose | 6.00 |
| | | Sodium Stearate | 1.00 |

The inorganic ceramic-forming ingredients may be cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate, borosilicate, soda barium borosilicate or combinations of these, as well as others. Combinations of these materials may be physical or chemical combinations, for example, mixtures or composites, respectively.

In one exemplary embodiment, the inorganic ceramic-forming ingredients may be those that yield cordierite, mullite, aluminum-titanate, silicon carbide, alumina, or mixtures of these on firing. Some ceramic batch material compositions for forming cordierite that are especially suited to the practice of the process described herein are those disclosed in U.S. Pat. No. 3,885,977 which is herein incorporated by reference as filed.

In another embodiment, the disclosure includes an aluminum-titanate ceramic article produced by providing aluminum-titanate-forming ingredients, a cellulose based binder, an aqueous based solvent and a pore forming agent, mixing the aluminum-titanate ceramic-forming ingredients, the binder, the solvent, and the pore forming agent to form a precursor batch, forming the precursor batch into a green honeycomb body and firing the green honeycomb body to produce the aluminum-titanate ceramic article, wherein steam is added to the kiln atmosphere during the top soak temperature of the firing cycle.

In another embodiment, the disclosure includes an mullite ceramic article produced by providing mullite-forming ingredients, a cellulose based binder, an aqueous based solvent and a pore forming agent, mixing the mullite ceramic-forming ingredients, the binder, the solvent, and the pore forming agent to form a precursor batch, forming the precursor batch into a green honeycomb body and firing the green honeycomb body to produce the mullite ceramic article, wherein steam is added to the kiln atmosphere during the top soak temperature of the firing cycle.

One composition, by way of a non-limiting example, which ultimately forms cordierite upon firing may be as follows in percent by weight, although it is to be understood that the claims are not limited to such: about 33-41, and most preferably about 34-40 of aluminum oxide, about 46-53 and most preferably about 48-52 of silica, and about 11-17 and most preferably about 12-16 magnesium oxide.

The inorganic ceramic-forming ingredients may be synthetically produced materials such as oxides, hydroxides, etc., or they may be naturally occurring minerals such as clays, talcs, or any combination of these. The process is not limited to the types of powders or raw materials. These may be chosen depending on the properties desired in the ceramic body.

The binder may be a cellulose-based binder wherein the cellulose-based binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof. Methylcellulose and/or methylcellulose derivatives may be especially suited as organic binders in the practice of the present disclosure with methylcellulose, hydroxypropyl methylcellulose, or combinations of these being preferred.

The properties of preferred cellulose-based binders such as methylcellulose may be water retention, water solubility, surface activity or wetting ability, thickening of the mixture, providing wet and dry green strength to the green bodies, thermal gelation and hydrophobic association in an aqueous environment. Cellulose ether binders that promote hydrogen bonding interaction with the solvent may be desirable. Non-limiting examples of substituent groups that maximize the hydrogen bonding interaction with polar solvents e.g. water, may be hydroxypropyl and hydroxyethyl groups, and to a smaller extent hydroxybutyl groups. The hydrophobically modified cellulose ether binder may makes up, as a super addition, typically about 1-10% by weight, and more typically about 2-6% by weight of the inorganic ceramic-forming material.

The ceramic precursor batch composition of the present disclosure may further comprise other additives such as surfactants, oil lubricants and pore-forming material. Non-limiting examples of surfactants that may be used in the practice of the present disclosure are $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.5% by weight to about 2% by weight.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight. In an exemplary embodiment, the oil lubricants may be present from about 3% by weight to about 6% by weight.

In filter applications, such as in diesel particulate filters, it may be desirable to include a pore forming material in the mixture in an amount effective to subsequently obtain the porosity required for efficient filtering. A pore forming material is any particulate substance (not a binder) that burns out of the green body in the firing step. Some types of pore forming materials that may be used include, but are not limited to, non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. Alternatively, gas or gas producing pore forming materials may also be used. The pore forming material may be up to about 60% by weight as a super addition. Typically, the amount of graphite may be from about 5% to about 30%, and more typically about 10% to about 20% by weight based on the inorganic ceramic-forming ingredients. If a combination of graphite and cellulose or starch is used, the amount of pore forming material may be typically from about 10% by weight to about 50% by weight with the graphite at 5% by weight to 40% by weight and the cellulose or starch at 5% by weight to about 40% by weight.

In another embodiment, there is provided a method for forming a cordierite ceramic honeycomb structure wherein the method comprises a steam assisted firing step. It will be appreciated that the ceramic articles of this disclosure may have any convenient size and shape and the disclosure is applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

As will be appreciated, the benefits of introducing steam into the firing atmosphere as described herein increase with increasing levels of pore forming material (and organic material in general) in the composition. In one embodiment, the organic pore forming materials comprise greater than about 20 weight percent by super addition, greater than 30 weight percent by super addition, greater than about 40 weight percent by super addition, or even greater than about 50 weight percent by super addition. In another embodiment, the organic materials in the batch comprise greater than about 30 weight percent by super addition, greater than 40 weight percent by super addition, greater than about 50 weight percent by super addition, or even greater than about 60 weight percent by super addition.

Generally honeycomb densities range from about 235 cells/cm$^2$ (1500 cells/in$^2$) to about 15 cells/cm$^2$ (100 cells/in$^2$). Examples of honeycombs produced by the process of the present disclosure cover that range and may have wall thicknesses of about 0.2 to 0.4 mm (8 to 14 mils). Typical wall thicknesses may be from about 0.07 to about 0.6 mm (about 3 to about 25 mils), although thicknesses of about 0.02-0.048 mm (1-2 mils) are possible. The method may be especially suited for extruding thin wall/high cell density honeycombs.

The process of the present disclosure may be particularly useful for the production of cordierite articles in general, and cordierite honeycomb monolith structures in particular. Cordierite exists in two main crystal forms in ceramic articles, orthorhombic (cordierite) and hexagonal (indialite). Greater amounts of the orthorhombic form are desirable as the amount of the orthorhombic is inversely related to the CTE. Therefore, the greater the amount of orthorhombic, the lower the CTE. In an illustrative embodiment, the total amount of cordierite in a cordierite ceramic article produced using the process of the present disclosure is greater than about 90% or greater than about 95%. In an alternate illustrative embodiment, the ratio of orthorhombic cordierite to hexagonal cordierite is greater than about 7 to 1, greater than about 9 to 1, greater than about 15 to 1, or even greater than about 17 to 1.

As seen from the data in Table 2, firing in the presence of steam can reduce the glassy phase of the ceramic article. The reduced glassy phase benefits CTE (i.e., lowered CTE) and long term stability of the part (e.g., creep resistance, improved thermal shock, devitrification resistance). In preferred embodiments, the glassy phase is less than about 5%, less than about 2%, or less than about 1%.

It will be apparent to those skilled in the art that various modifications and variations can be made to the embodiments described herein without departing from the spirit and scope of the claimed invention. Thus it is intended that the present disclosure includes such modifications and variations provided they come within the scope of the appended claims and their equivalents.

What is claimed is:

1. A process for producing a honeycomb ceramic article, the process comprising:
    providing a green honeycomb body including inorganic ceramic-forming materials and organic pore forming materials; and
    subjecting the green honeycomb body to a firing cycle in a kiln in which steam is added to the kiln atmosphere in an amount from about 40% to about 100%, based on volume.

2. The process of claim 1, wherein the addition of steam to the kiln atmosphere occurs at least during a portion of the firing cycle below about 1000° C.

3. The process of claim 1, wherein the inorganic ceramic-forming materials yield at least one of cordierite, mullite, aluminum-titanate, silicon carbide, or alumina when subjected to the firing cycle.

4. The process of claim 2, wherein the addition of steam to the kiln atmosphere occurs during a top soak portion of the firing cycle.

5. The process of claim 1, wherein the steam is mixed with air, oxygen, nitrogen or mixtures thereof.

6. The process of claim 1, wherein a kiln temperature is increased from room temperature to at least about 800° C. at a rate of from about 50° C/hr to about 100° C/hr.

7. The process of claim 1, wherein a kiln temperature is decreased from a top soak temperature during the firing cycle at a rate of greater than about 50°C./hour.

8. The process of claim 7, wherein the kiln temperature is decreased from a top soak temperature during the firing cycle at a rate of greater than about 100°C./hour.

9. The process of claim 1, wherein the firing cycle is less than about 100 hours long.

10. The process of claim 1, wherein the firing cycle is less than about 65 hours long.

11. The process of claim 1, wherein the organic pore forming materials comprise greater than about 20 weight percent by super addition.

12. The process of claim 1, wherein the organic pore forming materials comprise at least one of graphite and starch.

13. A ceramic article produced by:
    providing inorganic ceramic-forming ingredients, a cellulose based binder, an aqueous based solvent and a pore forming agent;
    mixing the ceramic-forming ingredients, the binder, the solvent, and the pore forming agent to form a precursor batch, the precursor batch comprising organic materials in an amount greater than about 30 wt. % by super addition;
    forming the precursor batch into a green honeycomb body; and
    firing the green honeycomb body to produce the ceramic article, wherein steam is added to a firing atmosphere in an amount from about 40% to about 100%, based on volume at least during a portion of the firing cycle below about 1000° C., wherein
    the inorganic ceramic-forming ingredients yield cordierite, and
    the ratio of orthorhombic cordierite to hexagonal cordierite is greater than about 9 to 1.

14. The ceramic article of claim 13, wherein firing comprises decreasing the temperature from a top soak temperature during the firing cycle at a rate of greater than about 100° C./hour.

15. The ceramic article of claim 13, wherein the ceramic article is a honeycomb monolith.

16. The ceramic article of claim 13, wherein the pore forming agent is at least one of graphite and starch.

17. The ceramic article of claim 13, wherein the steam is present from about 40% to about 60% by volume.

18. The ceramic article of claim 13, wherein the firing cycle is less than about 65 hours long.

19. A process for producing a honeycomb ceramic article, the process comprising:
   providing a green honeycomb body including inorganic ceramic-forming materials and organic pore forming materials; and
   subjecting the green honeycomb body to a firing cycle in a kiln in which steam is added to the kiln atmosphere in an amount from about 10% to about 100%, based on volume,
   wherein the inorganic ceramic-forming materials yield at least one of cordierite, mullite, aluminum-titanate, or alumina when subjected to the firing cycle.

* * * * *